(12) United States Patent
Liu

(10) Patent No.: US 12,050,309 B2
(45) Date of Patent: Jul. 30, 2024

(54) ZOOM LENS

(71) Applicant: GUANGZHOU LUXVISIONS INNOVATION TECHNOLOGY LIMITED, Guangzhou (CN)

(72) Inventor: Chuan-Hui Liu, Guangzhou (CN)

(73) Assignee: GUANGZHOU LUXVISIONS INNOVATION TECHNOLOGY LIMITED, Guangzhou (CN)

(*) Notice: Subject to any disclaimer, the term of this patent is extended or adjusted under 35 U.S.C. 154(b) by 319 days.

(21) Appl. No.: 17/670,532

(22) Filed: Feb. 14, 2022

(65) Prior Publication Data
US 2022/0308322 A1 Sep. 29, 2022

(30) Foreign Application Priority Data
Mar. 24, 2021 (CN) .......................... 202110314308.3

(51) Int. Cl.
*G02B 15/14* (2006.01)

(52) U.S. Cl.
CPC ....... *G02B 15/1425* (2019.08); *G02B 15/144* (2019.08)

(58) Field of Classification Search
CPC ................................................ G02B 15/1425
USPC ....................................................... 359/691
See application file for complete search history.

(56) References Cited

U.S. PATENT DOCUMENTS

| | | | | |
|---|---|---|---|---|
| 6,078,435 A | * | 6/2000 | Yoneyama | G02B 15/177 359/683 |
| 6,441,967 B2 | * | 8/2002 | Furuta | G02B 15/177 359/691 |
| 6,757,108 B2 | * | 6/2004 | Sensui | G02B 15/177 359/686 |
| 2004/0201902 A1 | * | 10/2004 | Mihara | G02B 15/144515 359/676 |
| 2006/0092525 A1 | * | 5/2006 | Sato | G02B 27/646 359/691 |
| 2008/0151385 A1 | * | 6/2008 | Ohashi | G02B 15/177 359/689 |
| 2012/0218646 A1 | * | 8/2012 | Kimura | G02B 15/177 359/691 |
| 2016/0306147 A1 | * | 10/2016 | Nakano | G02B 15/177 |

* cited by examiner

*Primary Examiner* — Darryl J Collins
(74) *Attorney, Agent, or Firm* — JCIPRNET

(57) ABSTRACT

A zoom lens includes a first lens group and a second lens group. A relative movement between the first lens group and the second lens group is allowed, whereby the zoom lens zooms between a wide-angle end and a telephoto end. While the zoom lens is switched from the wide-angle end toward an intermediate state, the first lens group is moved toward the image side. While the zoom lens is switched from the intermediate state toward the telephoto end, the first lens group is moved toward the object side.

17 Claims, 7 Drawing Sheets

ZOOM LENS

CROSS-REFERENCE TO RELATED APPLICATION

This application claims the priority benefit of Chinese Patent Application Serial No. 202110314308.3, filed on Mar. 24, 2021. The entirety of the above-mentioned patent application is hereby incorporated by reference herein and made a part of this specification.

BACKGROUND OF THE INVENTION

1. Field of the Invention

The present invention generally relates to a lens, particularly to a zoom lens.

2. Description of Related Art

A current phone lens module needs to utilize plural lens units in cooperation to achieve a desired zoom ratio in performing telephoto zoom. However, such zooming lowers the resolution of the resulting picture, and assembling the lens module becomes difficult when the number of the lens units increases.

SUMMARY OF THE INVENTION

The present invention provides a zoom lens that has a good resolution and can be assembled easily.

The zoom lens in some embodiments of the present invention comprises a first lens group and a second lens group. The first lens group comprises a first lens, a second lens, a third lens and a fourth lens arranged in sequence from the object side toward the image side. The second lens group is disposed between the first lens group and the image side, and comprises a fifth lens, a sixth lens, a seventh lens and an eighth lens arranged in sequence from the object side toward the image side. A relative movement between the first lens group and the second lens group is allowed, whereby the zoom lens zooms between a wide-angle end and a telephoto end. While the zoom lens is switched from the wide-angle end toward an intermediate state, the first lens group is moved toward the image side. While the zoom lens is switched from the intermediate state toward the telephoto end, the first lens group is moved toward the object side. While the zoom lens is switched to the intermediate state, the zoom lens has a zoom ratio of 1.83.

The zoom lens in some embodiments of the present invention comprises a first lens group and a second lens group. The first lens group comprises a first lens, a second lens, a third lens and a fourth lens arranged in sequence from the object side toward the image side. The second lens group is disposed between the first lens group and the image side, and comprises a fifth lens, a sixth lens, a seventh lens and an eighth lens arranged in sequence from the object side toward the image side. The zoom lens satisfies the relationships of $5<T/H<10$ and $0.3<(D_{11} \times F_w)/(H \times F_t)<0.9$, wherein H represents the maximum imaging height of the zoom lens, T represents the total length of the zoom lens, $D_{11}$ represents the diameter of the first lens, $F_w$ represents the equivalent focal length of the zoom lens at the wide-angle side, and $F_t$ represents the equivalent focal length of die zoom ins at the telephoto side.

In an embodiment, while the zoom lens is switched from the wide-angle end toward the telephoto end, the second lens group is moved toward the object side.

In an embodiment, while the zoom lens is being focused for the same zoom ratio, the distance between the first lens group and the second lens group is maintained constant.

In an embodiment, the zoom lens satisfies the relationships of $5<T/H<10$ and $0.3<(D_{11} \times F_w)/(H \times F_t)<0.9$, wherein H represents the maximum imaging height of the zoom lens, T represents the total length of the zoom lens, $D_{11}$ represents the diameter of the first lens, $F_w$ represents the equivalent focal length of the zoom lens at the wide-angle side, and $F_t$ represents the equivalent focal length of the zoom lens at the telephoto side.

In an embodiment, a relative movement between the first lens group and the second lens group is allowed, whereby the zoom lens zooms between the wide-angle end and the telephoto end. While the zoom lens is switched from the wide-angle end toward an intermediate state, the first lens group is moved toward the image side. While the zoom lens is switched from the intermediate state toward the telephoto end, the first lens group is moved toward the object side. While the zoom lens is switched to the intermediate state, the zoom lens has a zoom ratio of 1.83.

In an embodiment, the zoom lens further comprises an optical steering element, which has a constant position in the zoom lens.

In an embodiment, the zoom lens further comprises an aperture stop, which is disposed between the first lens group and the second lens group.

In an embodiment, the first lens group has a negative diopter, and the diopters of the first lens, the second lens, the third lens and the fourth lens are positive, negative, negative and positive, respectively.

In an embodiment, the second lens group has a positive diopter, and the diopters of the fifth lens, the sixth lens, the seventh lens and the eighth lens are positive, negative, negative and positive, respectively.

In an embodiment, at least four of the first lens, the second lens, the third lens, the fourth lens, the fifth lens, the sixth lens, the seventh lens and the eighth lens are aspheric lenses.

Accordingly, the zoom lens of this invention is able to meet the requirement of continuous optical zoom just by relative movement between the first lens group and the second lens group. Therefore, the optical arrangement of the zoom lens is simpler, and assembling and control of the same are easier while maintaining good imaging quality.

BRIEF DESCRIPTION OF THE DRAWINGS

Aspects of this invention are best understood from the following detailed description when read with the accompanying figures. In accordance with the standard practice in the industry, various features may not be drawn to scale, and the dimensions of the various features may be arbitrarily increased or reduced for clarity of discussion.

DESCRIPTION OF THE EMBODIMENTS

Figure 1:
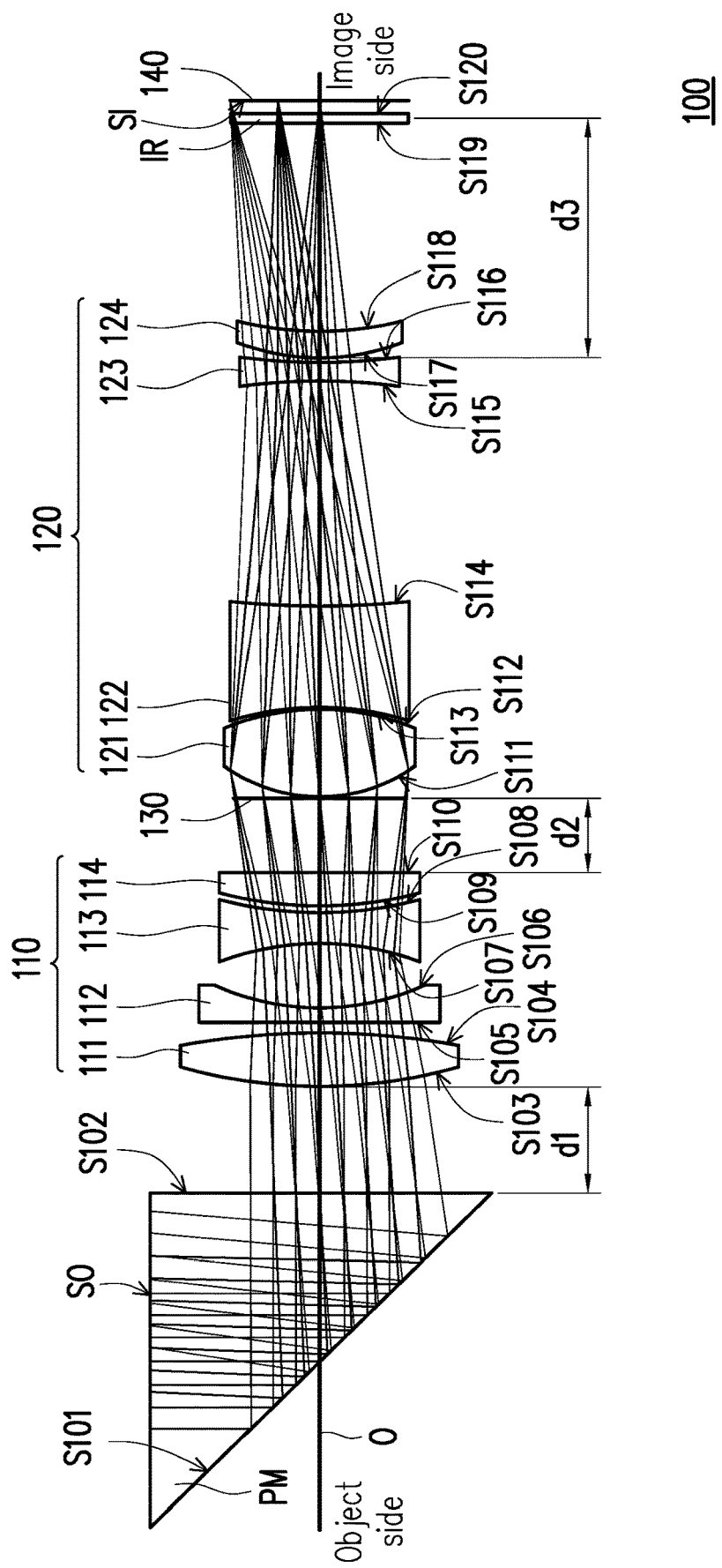
FIG. 1 schematically illustrates the structure of a zoom lens according to an embodiment of this invention.
Figure 3A:
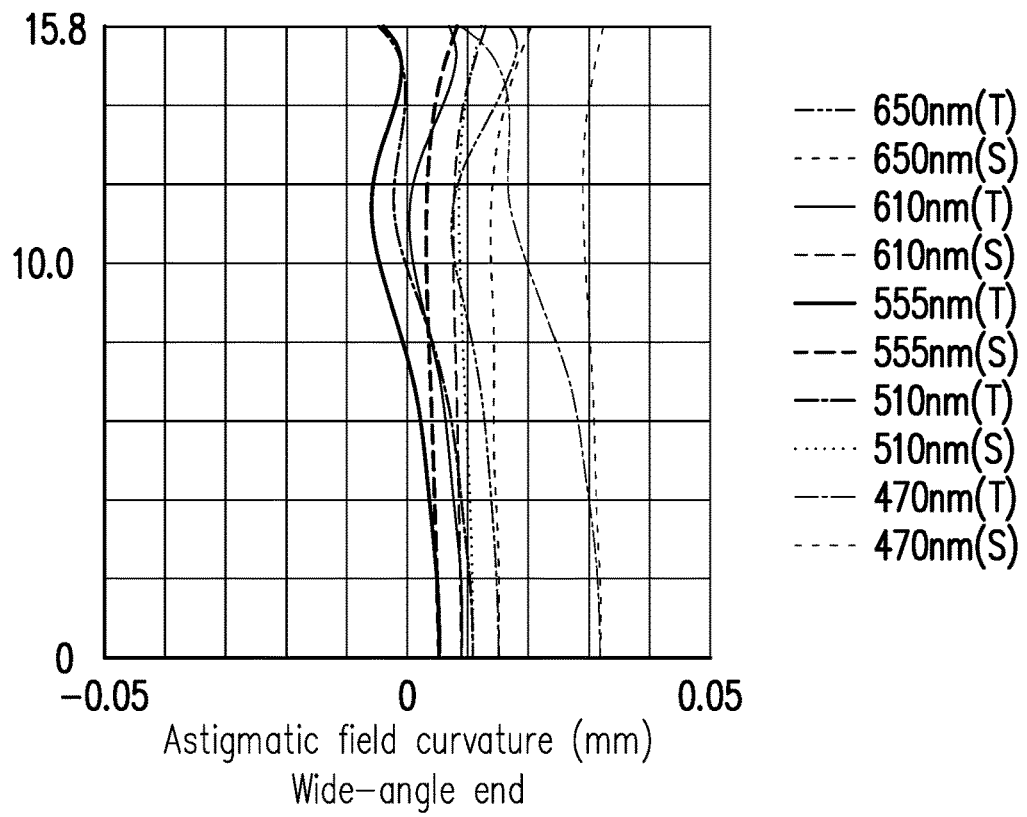
FIG. 3A and FIG. 3B show results of optical simulations for the wide-angle end of a zoom lens according to a first example in the above embodiment of this invention.
Figure 3B:
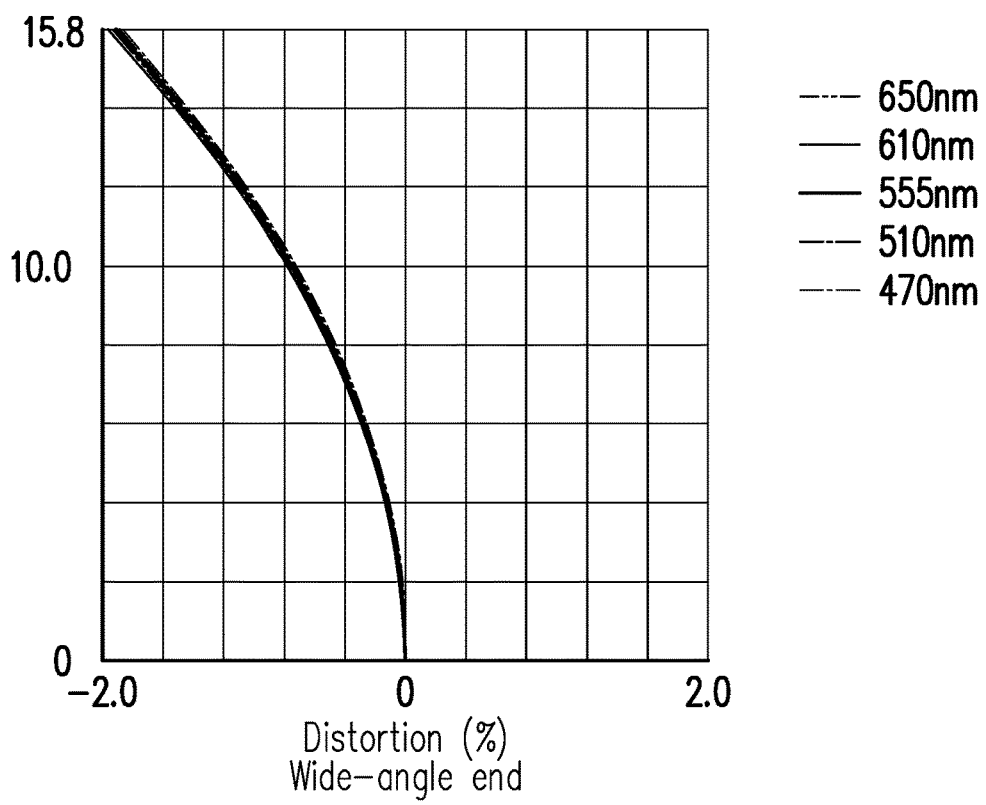
Figure 4A:
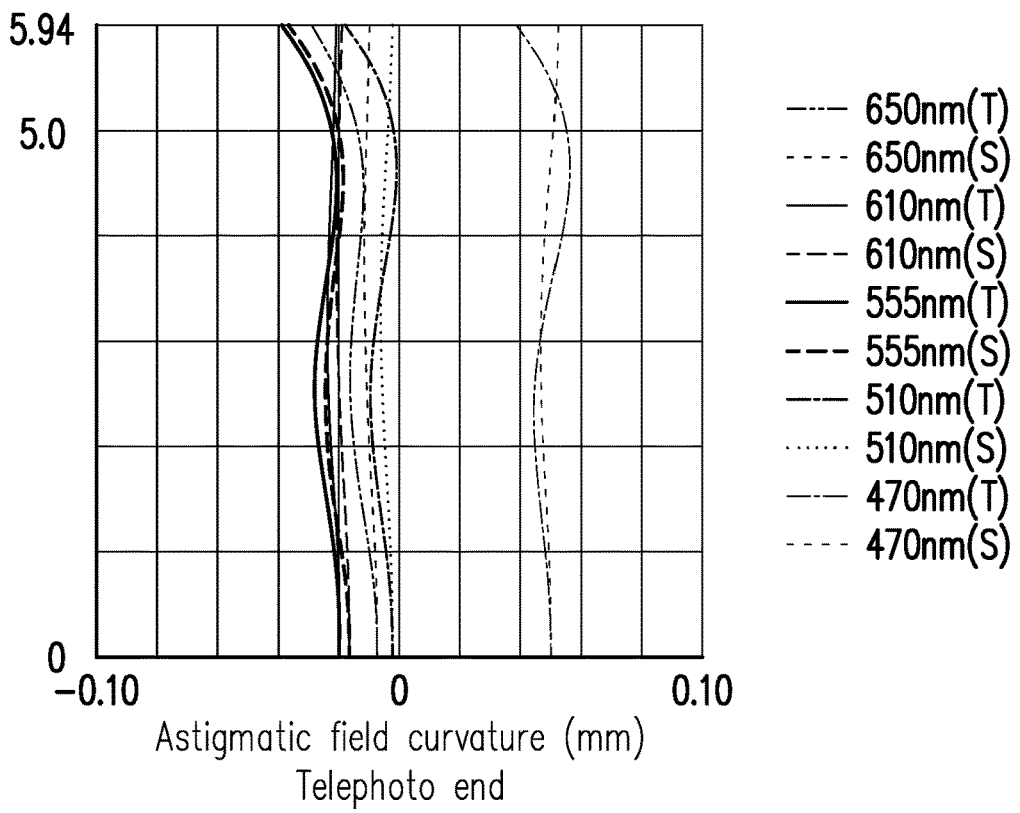
FIG. 4A and FIG. 4B show results of optical simulations for the telephoto end of the zoom lens according to the first example.
Figure 4B:
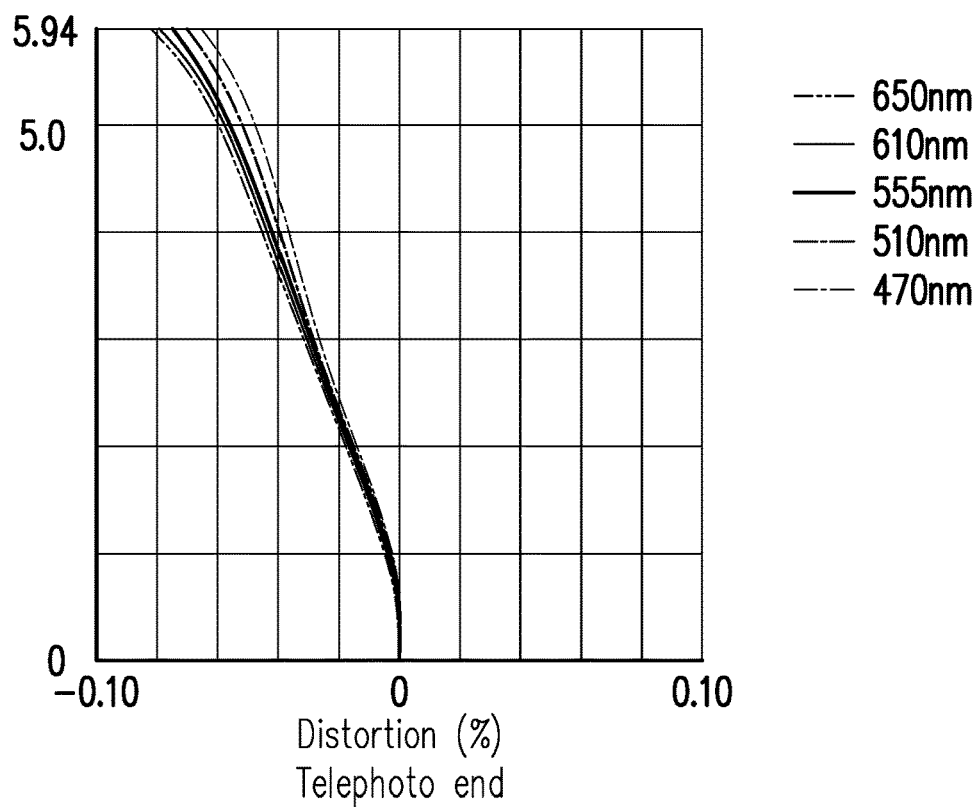

FIG. 1 schematically illustrates the structure of a zoom lens according to an embodiment of this invention. FIG. 2 schematically illustrates configurations of the zoom lens of FIG. 1 at the wide-angle end, at the intermediate state, and at the telephoto end, respectively. FIG. 3A and FIG. 3B show results of optical simulations for the wide-angle end of a zoom lens according to a first example in the above embodiment. FIG. 4A and FIG. 4B show results of optical simulations for the telephoto end of the zoom lens according to the first example. Referring to FIG. 1, the zoom lens 100 includes an optical steering element PM, a first lens group 110 and a second lens group 120. The first lens group 110 includes a first lens 111, a second lens 112, a third lens 113 and a fourth lens 114 arranged in sequence from the object side toward the image side. The first lens group 110 has a negative diopter, and the diopters of the first lens 111, the second lens 111, the third lens 113 and the fourth lens 114 are positive, negative, negative and positive, respectively. The second lens group 120 is disposed between the first lens group 110 and the image side, and includes an aperture stop 130, a fifth lens 121, a sixth lens 122, a seventh lens 123 and an eighth lens 124 arranged in sequence from the object side toward the image side. The aperture stop 130 is disposed between the first lens group 110 and the second lens group 120. The second lens group 120 has a positive diopter, and the diopters of the fifth lens 121, the sixth lens 122, the seventh lens 123 and the eighth lens 124 are positive, negative, negative and positive, respectively. More specifically, in this embodiment, the first lens 111, the second lens 112, the third lens 113, the fourth lens 114, the fifth lens 121, the sixth lens 122, the seventh lens 123 and the eighth lens 124 are a biconvex lens, a biconcave lens, a biconcave lens, a biconvex lens, a biconvex lens, a biconcave lens, a biconcave lens, and a meniscus lens with the concave side facing the image side, respectively.

Figure 2A:
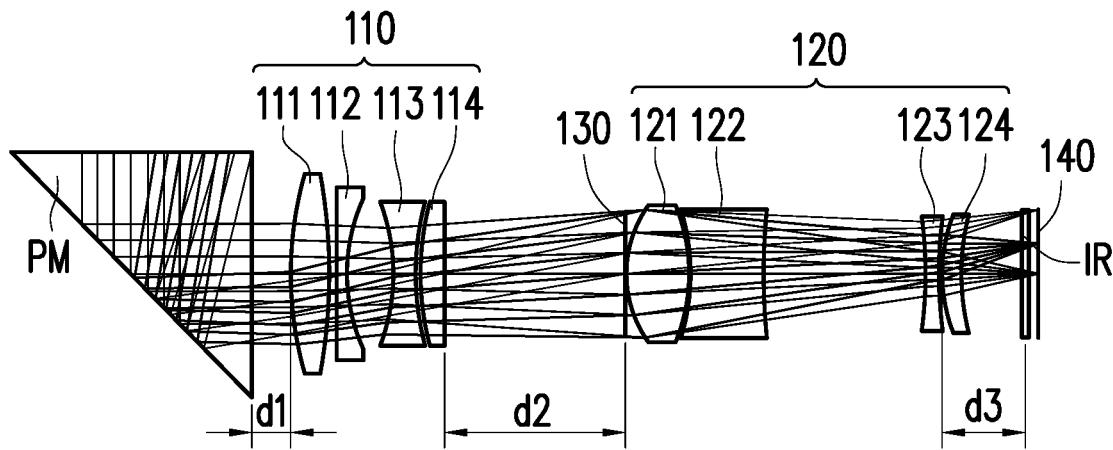
FIG. 2A to FIG. 2C schematically illustrate configurations of the zoom lens of FIG. 1 at the wide-angle end, at the intermediate state, and at the telephoto end, respectively.
Figure 2B:
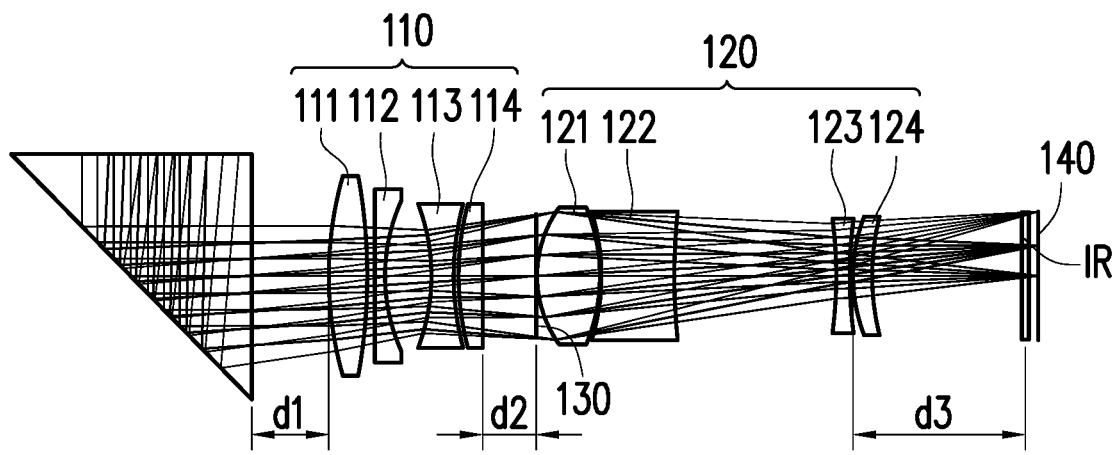
Figure 2C:
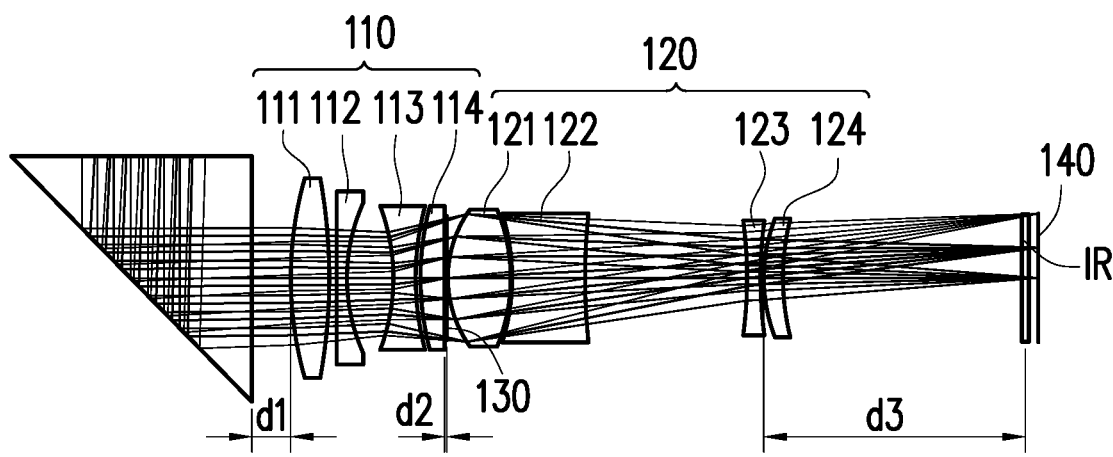

Specifically, as shown in FIGS. 2A to 2C, in this embodiment, the position of the optical steering element PM in the zoom lens 100 is maintained constant, and a relative movement between the first lens group 110 and the second lens group 120 is allowed, whereby the zoom lens 100 zooms between the wide-angle end and a telephoto end. In this embodiment, the optical steering element PM may be a triangular prism, for example. The optical steering element PM has a surface SO, a surface S101 and a surface S102, wherein the surface S101 connects the surface SO and the surface S102, and the surface 102 faces the first lens group 110. A light beam incident to the optical steering element PM from the surface SO is reflected by the surface S101 and then leave the optical steering element PM from the surface 102. Thus, by including the optical steering element PM, the zoom lens 100 of this embodiment is able to change the traveling direction of the image light coming from the object being photographed, so the optical elements in the zoom lens can be arranged compactly reducing the size.

More specifically, as shown in FIGS. 2A to 2C, in this embodiment, while the zoom lens 100 is switched from the wide-angle end toward the telephoto end, the second lens group 120 may be moved toward the object side. While the zoom lens 100 is switched from the wide-angle end toward the intermediate state, the first lens group 110 may be moved toward the image side. While the zoom lens 100 is switched from the intermediate state toward the telephoto end, the first lens group 110 may be moved toward the object side. In the above process, the variable pitch d1 first gradually gets larger until the intermediate state and then gradually gets smaller, the variable pitch d2 gradually gets smaller, and the variable pitch d3 gradually gets larger, whereby the focal length of the zoom lens 100 is switched from the wide-angle end to the intermediate state and then to the telephoto end.

In an example of this embodiment, the zoom ratios of the zoom lens 100 at the wide-angle end, at the intermediate state, and at the telephoto end are 3, 1.83, and 8, respectively. In this embodiment, while the zoom lens 100 is being focused for the same zoom ratio, the movement displacement of the first lens group 110 and that of the second lens group 120 are the same. That is, while the zoom lens 100 is being focused for the same zoom ratio, the distance between the first lens group 110 and the second lens group 120 is maintained constant.

On the other hand, when the first lens group 110 and the second lens group 120 are relatively moved in a operation opposite to the above operation, the zoom lens 100 is switched from the telephoto end toward the intermediate state and the wide-angle end. In such process, the variable pitch d1 first gradually gets smaller until the intermediate state and then gradually gets larger, the variable pitch d2 gradually gets larger, and the variable pitch d3 gradually gets smaller, whereby the focal length of the zoom lens 100 is switched from the telephoto end to the intermediate state and then to the wide-angle end.

Thus, the zoom lens 100 of this embodiment is able to meet the requirement of continuous optical zoom just by a relative movement between the first lens group 110 and the second lens group 120. Therefore, the optical arrangement of the zoom lens 100 is simpler, and assembling of the same is easier.

Specifically, in this embodiment, the zoom lens may satisfy the relationships of $5<T/H<10$ and $0.3<(D_{11} \times F_w)/(H \times F_t)<0.9$, where H represents the maximum imaging height of the zoom lens 100, T represents the total length of the same, $D_{11}$ represents the diameter of the first lens 111, $F_w$ represents the equivalent focal length of the zoom lens 100 at the wide-angle side, and $F_t$ represents the equivalent focal length of the zoom lens 100 at the telephoto side. The imaging height H is the diagonal length of the image picture formed on the imaging surface. In this embodiment, the half imaging height is defined as the distance from the optical axis O to the point in the image picture formed on the imaging surface S1 of the image sensing device 140 at the image side that is farthest from the optical axis O, wherein the distance is a distance in a direction perpendicular to the optical axis O. In this embodiment, because the optical axis of the image sensing device 140 coincides with the optical axis O of the zoom lens 100, double of the half imaging height is equal to the diagonal length of the image picture formed on the imaging surface S1. In addition, the total length of the zoom lens 100 may be 35 millimetres in this embodiment, but this invention is not limited thereto.

In the above zoom lens 100, at least four of the first lens 111, the second lens 112, the third lens 113, the fourth lens 114, the fifth lens 121, the sixth lens 122, the seventh lens 123 and the eighth lens 124 are aspheric lenses. In this embodiment, it is possible that the first lens 111, the second lens 112, the third lens 113 and the fourth lens 114 in the first lens group 110 are spherical lenses and the fifth lens 121, the sixth lens 122, the seventh lens 123 and the eighth lens 124 in the second lens group 120 are aspheric lenses, but this invention is not limited thereto. Moreover, the materials of the first lens 111 to the eighth lens 124 may be selected from glass and plastic. For example, it is possible that the first lens 111, the second lens 112, the third lens 113 and the fourth lens 114 in the first lens group 110 are glass lenses and the fifth lens 121, the sixth lens 122, the seventh lens 123 and the eighth lens 124 in the second lens group 120 are plastic lenses, but this invention is not limited thereto.

In addition, in this embodiment, when the zoom lens 100 is used in image formation, an infrared cut filter IR and an image sensing device 140 may be disposed at the image side, where the surface SI is the imaging surface of the image sensing device 140. Moreover, in this embodiment, the image sensing device 140 may be a charge coupled device (CCD) or a CMOS image sensing device.

An example of the zoom lens 100 is given below, but the data listed below are not intended to limit this invention, and one of ordinary skill in the art, after referring to the disclosure for this invention, would be able to properly alter the parameter values or settings thereof without departing from the scope of this invention.

TABLE 1

| Surface | Curvature radius (mm) | Pitch (mm) | Refractive index | Abbe number | Note |
|---|---|---|---|---|---|
| SO | ∞ | ∞ | | | |
| S101 | ∞ | 11.000 | | | Optical steering element PM |
| S102 | ∞ | Variable pitch (d1) | | | |
| S103 | 14.963 | 1.722 | 1.517 | 64.167 | First lens 111 |
| S104 | −24.827 | 0.362 | | | |
| S105 | −651.428 | 0.500 | 1.620 | 60.374 | Second lens 112 |
| S106 | 9.162 | 2.203 | | | |
| S107 | −7.331 | 0.913 | 1.517 | 64.167 | Third lens 113 |
| S108 | 11.229 | 0.226 | | | |
| S109 | 12.051 | 1.111 | 1.673 | 32.179 | Fourth lens 114 |
| S110 | −1331.759 | Variable pitch (d2) | | | |
| 130 | ∞ | 0.100 | | | 130: Aperture stop |
| S111 | 5.329 | 2.842 | 1.545 | 55.987 | Fifth lens 121 |
| S112 | −6.460 | 0.100 | | | |
| S113 | −9.470 | 3.290 | 1.643 | 22.456 | Sixth lens 122 |
| S114 | 34.736 | 7.425 | | | |
| S115 | 71.681 | 0.599 | 1.545 | 55.987 | Seventh lens 123 |
| S116 | 8.173 | 0.201 | | | |
| S117 | 8.228 | 0.888 | 1.643 | 22.456 | Eighth lens 124 |
| S118 | 13.675 | Variable pitch (d3) | | | |
| S119 | ∞ | 0.210 | 1.517 | 64.167 | Infrared cut filter IR |
| S120 | ∞ | 0.500 | | | |
| SI | ∞ | 0.00 | | | Image sensing device 140 |

In Table 1, "curvature radius" means the curvature radius of the surface, and "pitch" means the distance between the surface and the next neighboring surface. For example, the pitch of the surface S101 means the distance from the surface S101 to the surface S102 in the optical axis O. The thickness, refractive index and Abbe number of each lens in the "Note" column refer to the pitch value, the refractive index value and the Abbe number listed in the same row. In addition, the surface S101 and the surface S102 are the reflection surface and the light-emitting surface of the optical steering element PM, respectively. The surface S103 and the surface S104 are the two surfaces of the first lens 111. The surface S105 and the surface S106 are the two surfaces of the second lens 112. The surface S107 and the surface S108 are the two surfaces of the third lens 113. The surface S109 and the surface S110 are the two surfaces of the fourth lens 114. The aperture stop 130 is located on the surface S111. The surface S111 and the surface S112 are the two surfaces of the fifth lens 121. The surface S113 and the surface S114 are the two surfaces of the sixth lens 122. The surface S115 and the surface S116 are the two surfaces of the seventh lens 123. The surface S117 and the surface S118 are the two surfaces of the eighth lens 124. The surface S119 and the surface S120 are the two surfaces of the infrared cut filter IR. The surface SI is the imaging surface of the image sensing device 140.

As mentioned above, the surfaces S111, S112, S113, S114, S115, S116, S117 and S118 are aspheric surfaces. The formula of an aspheric surface is given below:

$$Z = \frac{(1/R)H^2}{1+\sqrt{1-(1+K)(H/R)^2}} + AH^4 + BH^6 + CH^8 + DH^{10} + EH^{12} + FH^{14} + GH^{16}$$

wherein Z is the position deviation in the direction of the optical axis O, R is the radius of the osculating sphere, namely the curvature radius near the optical axis O, K is the conic constant, H is the aspheric height, namely the height from the lens center toward the lens edge, and A, B, C, D, E, F and G are aspheric coefficients. According to this formula, the Z value varies with the H value. The aspheric coefficients and the K values of the surfaces S111, S112, S113, S114, S115, S116, S117 and S118 are shown in Table 2 below.

TABLE 2

| Surface | K | A | B | C | D | E | F | G |
|---|---|---|---|---|---|---|---|---|
| S111 | −7.61E−01 | 4.72E−04 | 8.88E−06 | 1.21E−07 | 2.84E−08 | 8.97E−09 | 5.90E−11 | −2.24E−12 |
| S112 | 0 | 1.57E−03 | 7.04E−05 | −3.34E−07 | −3.66E−08 | 1.74E−09 | −1.88E−10 | 1.61E−11 |
| S113 | 0 | −3.43E−04 | 1.12E−04 | 3.40E−06 | −5.28E−07 | −2.36E−09 | −8.73E−11 | 3.08E−11 |

TABLE 2-continued

| Surface | K | A | B | C | D | E | F | G |
|---|---|---|---|---|---|---|---|---|
| S114 | 0 | −1.65E−05 | 9.87E−05 | 7.69E−06 | −9.17E−07 | 5.20E−08 | −2.56E−10 | −8.13E−12 |
| S115 | 0 | −9.52E−03 | 7.69E−04 | −1.74E−05 | 5.75E−07 | −7.11E−08 | −1.11E−08 | −2.66E−10 |
| S116 | 0 | −1.02E−02 | 8.40E−04 | 6.08E−06 | −6.76E−06 | 8.59E−07 | −5.02E−08 | 8.51E−11 |
| S117 | 0 | −8.07E−04 | −2.74E−05 | 7.94E−05 | −2.60E−05 | 3.63E−06 | −2.36E−07 | 5.76E−09 |
| S118 | 0 | −2.10E−04 | 1.32E−04 | −1.15E−05 | −2.63E−06 | −2.62E−07 | 1.16E−07 | −7.33E−09 |

The values of certain important parameters of the zoom lens 100 including equivalent focal length, field of view, f-number and the variable pitches d1, d2 and d3 at the wide-angle end, the intermediate state or the telephoto end are listed in Table 3.

TABLE 3

| | | Wide-angle end | Intermediate state | Telephoto end |
|---|---|---|---|---|
| Equivalent focal length (mm) | | 10.51 | 19.28 | 28.04 |
| F-number | | 3.00 | 4.25 | 5.50 |
| Field of view (°) | | 31.6 | 17.2 | 11.8 |
| Variable pitches | d1 | 2.40 | 3.56 | 1.00 |
| (mm) | d2 | 8.34 | 2.42 | 0.20 |
| | d3 | 2.07 | 6.84 | 11.61 |

FIG. 3A shows the result of simulating the astigmatic field curvature of the zoom lens 100 at the wide-angle end using different light wavelengths including 470 nm, 510 nm, 555 nm, 610 nm and 650 nm, wherein the lateral axis is the distance from the focal plane, of which the maximum value is 0.033 mm, the vertical axis is from zero to the maximum field of view (15.8°), "S" means the data of the sagittal direction, and "T" means the data of the tangential direction. FIG. 3B shows the result of simulating the distortion using different light wavelengths including 470 nm, 510 nm, 555 nm, 610 nm and 650 nm, wherein the lateral axis is the distortion in percent, of which the maximum value is −1.941%, and the vertical axis is from 0 to the maximum field of view (15.8°). FIG. 4A/4B is different from FIG. 3A/3B in that its simulation is for the telephoto end, wherein the maximum value of the vertical axis (namely the maximum field of view) is 5.94° and other simulation conditions are the same as those of FIG. 3A/3B.

As shown in FIGS. 3A, 3B, 4A and 4B, the zoom lens 100 has good imaging qualities in terms of the distortion and the astigmatic field curvature when the focal length is at any of the wide-angle end and the telephoto end. Therefore, the zoom lens 100 of this embodiment has merits of easy assembling and control while maintaining good imaging quality.

Figure 5:
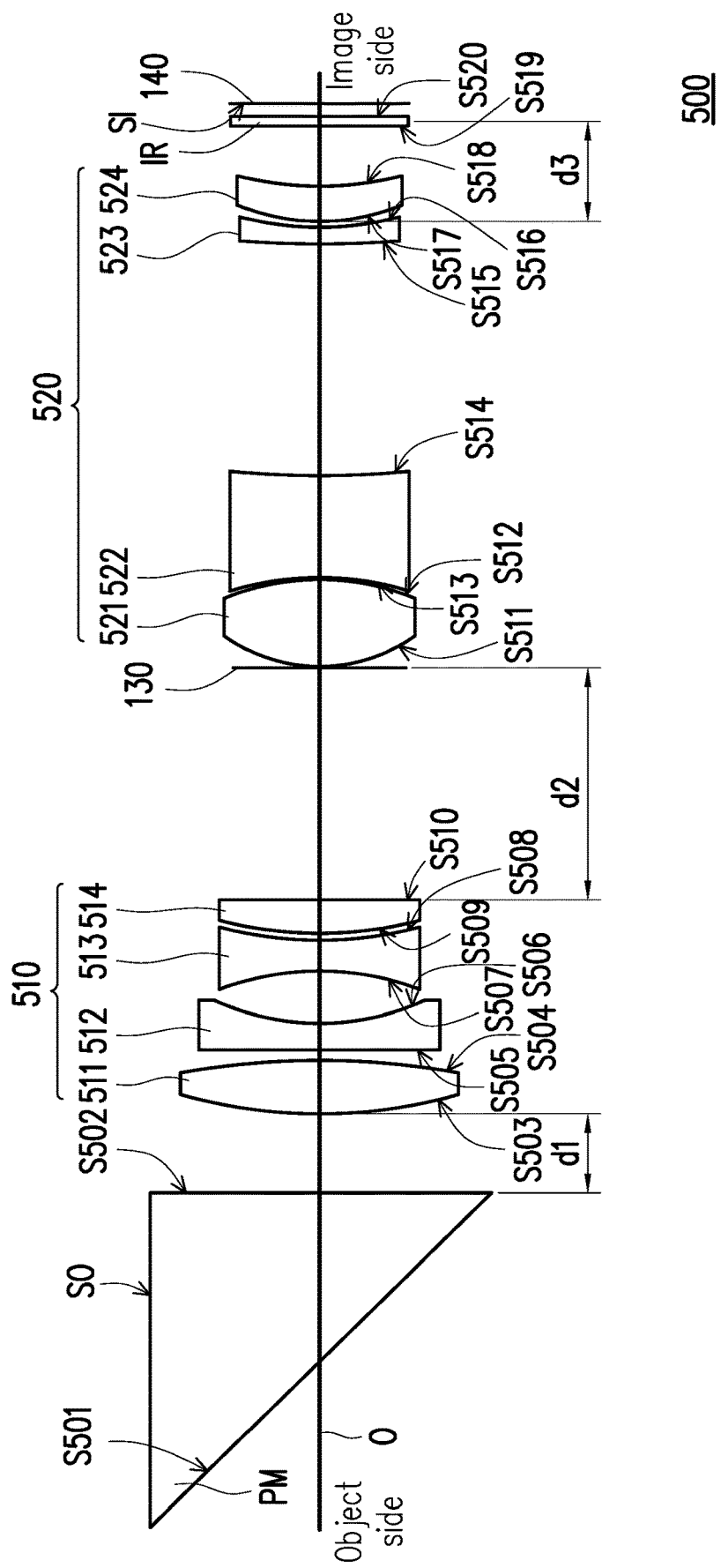
FIG. 5 schematically illustrates the structure of a zoom lens according to another embodiment of this invention.
Figure 6A:
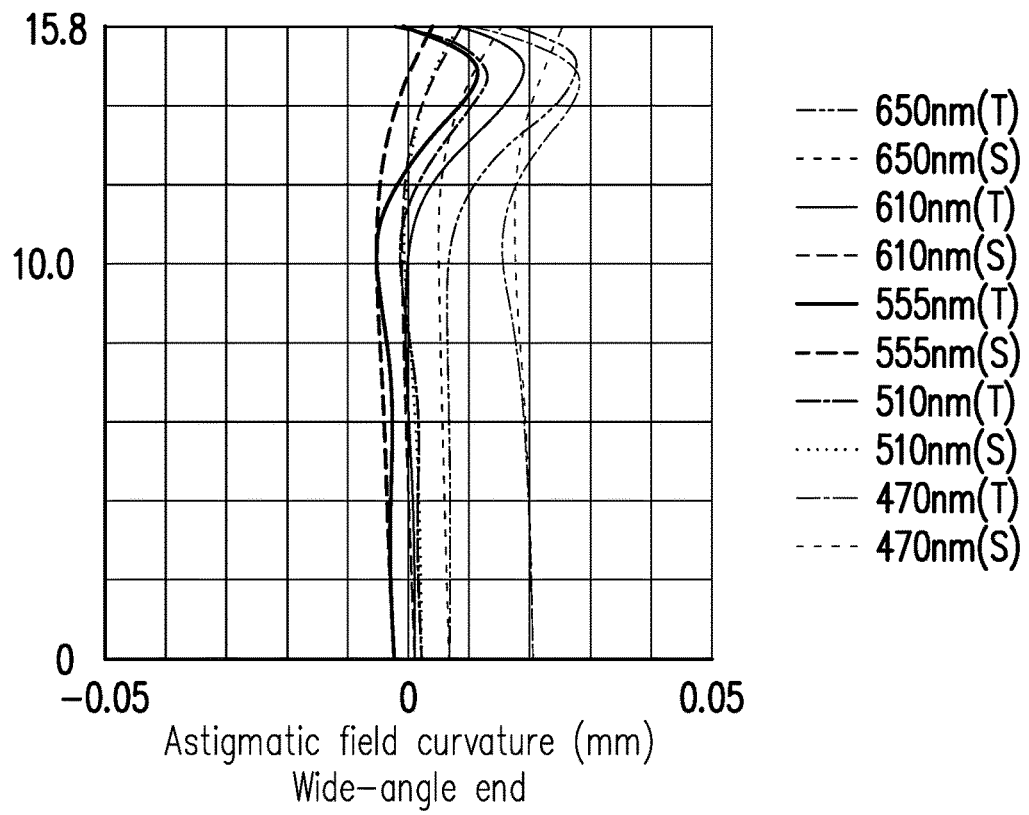
FIG. 6A and FIG. 6B show results of optical simulations for the wide-angle end of a zoom lens according to a second example in the another embodiment of this invention.
Figure 6B:
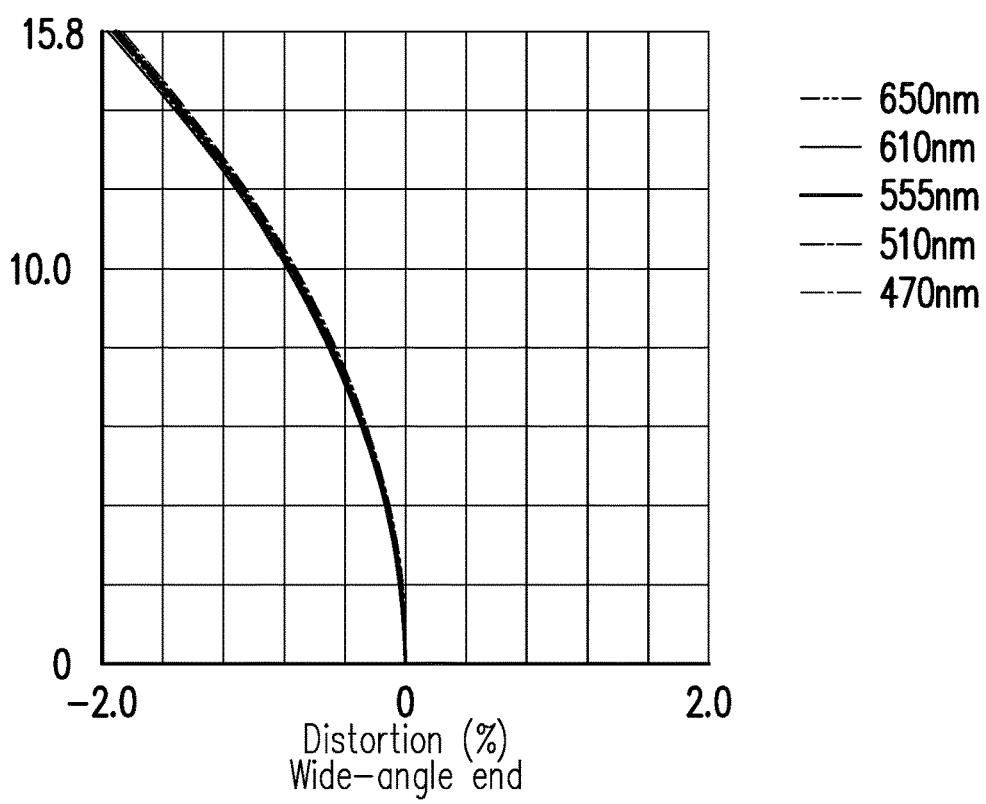
Figure 7A:
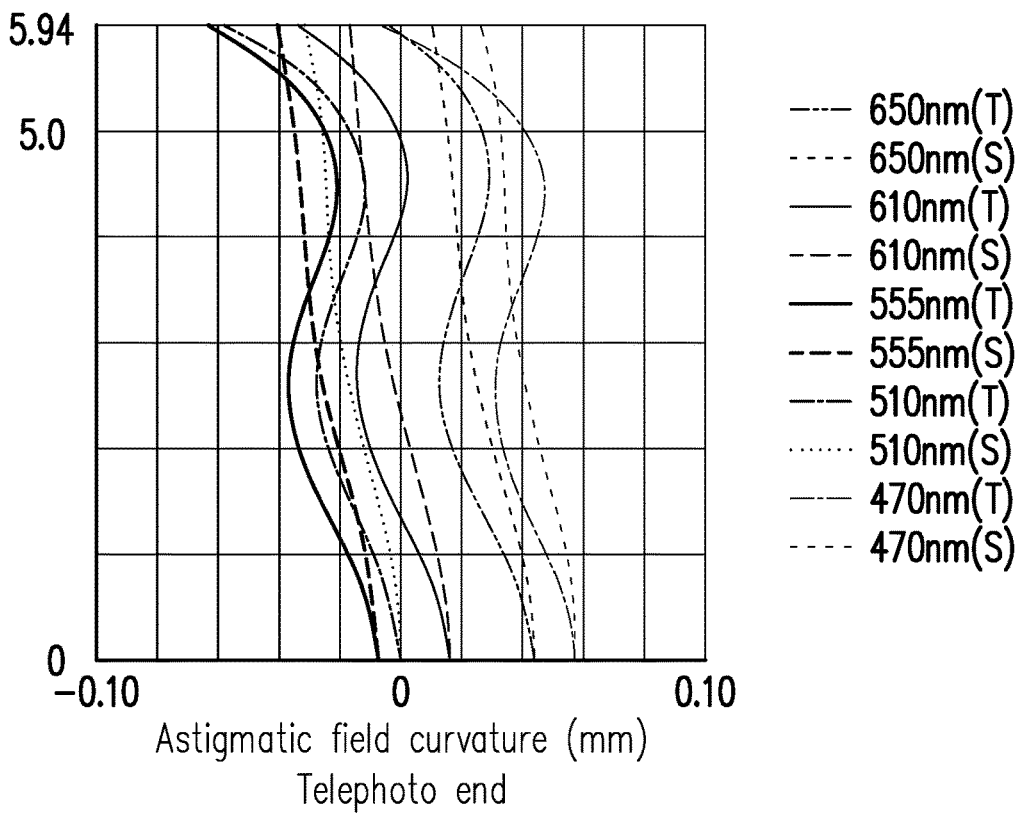
FIG. 7A and FIG. 7B show results of optical simulations for the telephoto end of the zoom lens according to the second example.
Figure 7B:
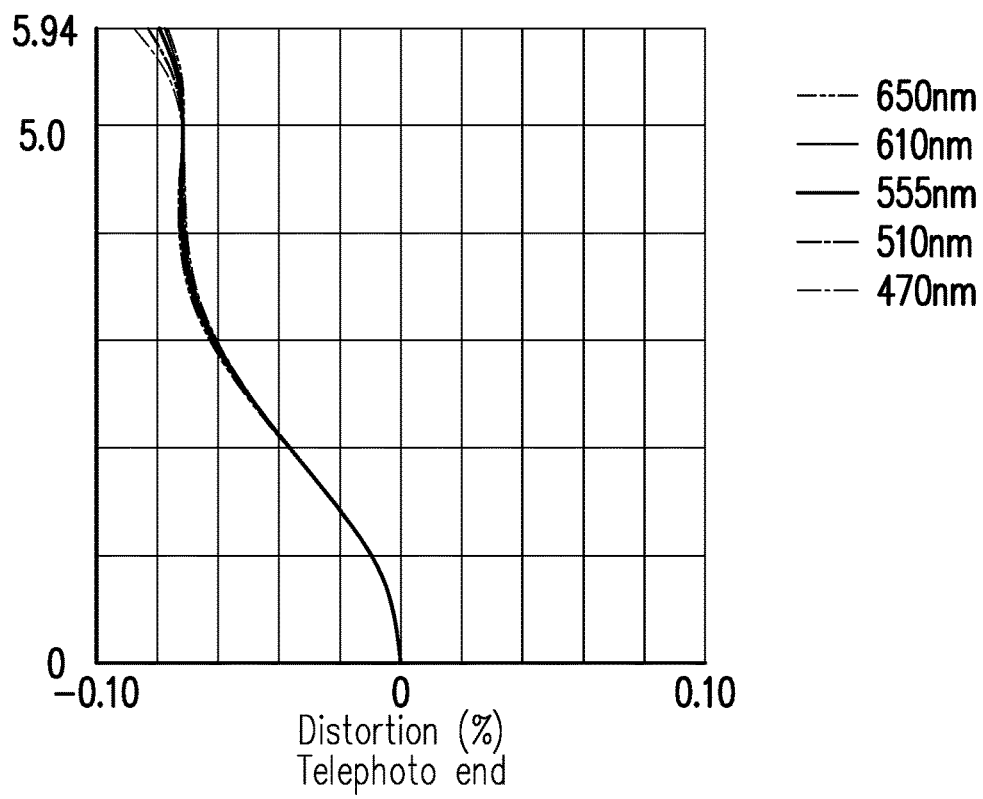

FIG. 5 schematically illustrates the structure of a zoom lens according to another embodiment of this invention. FIG. 6A and FIG. 6B show results of optical simulations for the wide-angle end of a zoom lens according to a second example in the another embodiment. FIG. 7A and FIG. 7B show the result of an optical simulation for the telephoto end of the zoom lens according to the second example. Referring to FIG. 5, the zoom lens 500 is like the zoom lens 100 of FIG. 1, and is different from the latter in that the kinds of some lenses, the aspheric coefficients and other parameter values are slightly different.

More specifically, in this embodiment, the first lens 511, the second lens 512, the third lens 513, the fourth lens 514, the fifth lens 521, the sixth lens 522, the seventh lens 523 and the eighth lens 524 are a biconvex lens, a meniscus lens with the concave side facing the image side, a biconcave lens, a biconvex lens, a biconvex lens, a biconcave lens, a meniscus lens with the concave side facing the image side, and a meniscus lens with the concave side facing the image side, respectively.

The first lens 511 and the second lens 512 in the first lens group 510 are glass spherical lenses, and the third lens 513 and the fourth lens 514 in the first lens group 510 and the fifth lens 521, the sixth lens 522, the seventh lens 523 and the eighth lens 524 in the second lens group 520 are plastic aspheric lenses. Except for these, in this embodiment, the structure and operation mechanism of the zoom lens 500 are similar to those of the above zoom lens 100, so related details may refer to the above related paragraphs and are not repeated here. Meanwhile, since the zoom lens 500 is similar to the zoom lens 100 in structure, it has the same merits of the zoom lens 100, so the merits thereof are not repeated here.

An example of the zoom lens 500 is given below, but the data listed below are not intended to limit this invention, and one of ordinary skill in the art, after referring to the disclosure for this invention, would be able to properly alter the parameters or settings thereof without departing from the scope of this invention.

TABLE 4

| Surface | Curvature radius (mm) | Pitch (mm) | Refractive index | Abbe number | Note |
|---|---|---|---|---|---|
| SO | ∞ | ∞ | | | |
| S501 | ∞ | 11.000 | | | Optical steering element PM |
| S502 | ∞ | Variable pitch (d1) | | | |
| S503 | 18.349 | 1.646 | 1.517 | 64.167 | First lens 511 |

TABLE 4-continued

| Surface | Curvature radius (mm) | Pitch (mm) | Refractive index | Abbe number | Note |
|---|---|---|---|---|---|
| S504 | −21.606 | 0.392 | | | |
| S505 | 42.866 | 1.006 | 1.620 | 60.374 | Second lens 512 |
| S506 | 8.784 | 1.630 | | | |
| S507 | −6.348 | 0.786 | 1.545 | 55.987 | Third lens 513 |
| S508 | 16.371 | 0.286 | | | |
| S509 | 15.722 | 1.099 | 1.643 | 22.456 | Fourth lens 514 |
| S510 | −466.499 | Variable pitch (d2) | | | |
| 130 | ∞ | 0.100 | | | 130: Aperture stop |
| S511 | 5.234 | 2.726 | 1.545 | 55.987 | Fifth lens 521 |
| S512 | −6.326 | 0.109 | | | |
| S513 | −9.348 | 3.450 | 1.643 | 22.456 | Sixth lens 522 |
| S514 | 32.181 | 7.442 | | | |
| S515 | 11.454 | 0.507 | 1.545 | 55.987 | Seventh lens 523 |
| S516 | 5.900 | 0.208 | | | |
| S517 | 6.981 | 1.158 | 1.643 | 22.456 | Eighth lens 524 |
| S518 | 9.545 | Variable pitch (d3) | | | |
| S519 | ∞ | 0.210 | 1.517 | 64.167 | Infrared cut filter IR |
| S520 | ∞ | 0.500 | | | |
| SI | ∞ | | | | Image sensing device 140 |

In Table 4, "curvature radius" means the curvature radius of the surface, and "pitch" means the distance between the surface and the next neighboring surface. For example, the pitch of the surface S501 means the distance from the surface S501 to the surface S502 in the optical axis O. The thickness, refractive index and Abbe number of each lens in the "Note" column refer to the pitch value, the refractive index value and the Abbe number listed in the same row. In addition, the surface S501 and the surface S502 are the reflection surface and the light-emitting surface of the optical steering element PM, respectively. The surface S503 and the surface S504 are the two surfaces of the first lens 511. The surface S505 and the surface S506 are the two surfaces of the second lens 512. The surface S507 and the surface S508 are the two surfaces of the third lens 513. The surface S509 and the surface S510 are the two surfaces of the fourth lens 514. The aperture stop 130 is located on the surface S511. The surface S511 and the surface S512 are the two surfaces of the fifth lens 521. The surface S513 and the surface S514 are the two surfaces of the sixth lens 522. The surface S515 and the surface S516 are the two surfaces of the seventh lens 523. The surface S517 and the surface S518 are the two surfaces of the eighth lens 524. The surface S519 and the surface S520 are the two surfaces of the infrared cut filter IR. The surface SI is the imaging surface of the image sensing device 140.

As mentioned above, the surfaces S507, S508, S509, S510, S511, S512, S513, S514, S515, S516, S517 and S118 are aspheric surfaces. The equation of an aspheric surface is given below:

$$Z = \frac{(1/R)H^2}{1 + \sqrt{1 - (1+K)(H/R)^2}} + AH^4 + BH^6 + CH^8 + DH^{10} + EH^{12} + FH^{14} + GH^{16}$$

wherein Z is the position deviation in the direction of the optical axis O, R is the radius of the osculating sphere, namely the curvature radius near the optical axis O, K is the conic constant, H is the aspheric height, namely the height from the lens center toward the lens edge, and A, B, C, D, E, F and G are aspheric coefficients. According to this formula, the Z value varies with the H value. The aspheric coefficients and the K values of the surfaces S507, S508, S509, S510, S511, S512, S513, S514, S515, S516, S517 and S518 are shown in Table 5 below.

TABLE 5

| Surface | K | A | B | C | D | E | F | G |
|---|---|---|---|---|---|---|---|---|
| S507 | 0 | 9.30E−05 | 1.14E−05 | 9.20E−08 | 2.97E−08 | 2.48E−09 | −4.36E−10 | −7.84E−12 |
| S508 | 0 | −4.77E−05 | −2.27E−06 | −3.22E−08 | −1.60E−08 | 2.14E−09 | −5.97E−10 | −2.88E−11 |
| S509 | 0 | −4.99E−05 | −5.64E−06 | −4.96E−07 | −2.88E−08 | −3.85E−09 | −2.45E−10 | −1.35E−11 |
| S510 | 0 | 2.94E−06 | −5.08E−07 | −9.83E−08 | −4.32E−08 | −1.37E−09 | −1.73E−10 | 3.05E−12 |
| S511 | −7.62E−01 | 4.72E−04 | 1.09E−05 | 1.59E−07 | 1.59E−08 | 9.62E−09 | −2.56E−11 | −5.05E−13 |
| S512 | 0 | 1.55E−03 | 6.95E−05 | −4.12E−07 | −4.04E−08 | −6.30E−10 | −2.71E−11 | −3.31E−12 |
| S513 | 0 | −3.35E−04 | 1.08E−04 | 3.06E−06 | −5.52E−07 | 1.21E−10 | −1.10E−11 | −4.15E−12 |
| S514 | 0 | 1.17E−04 | 1.08E−04 | 8.37E−06 | −9.69E−07 | 6.45E−08 | 2.09E−10 | −1.04E−11 |
| S515 | 0 | −9.63E−03 | 7.22E−04 | −1.69E−05 | 2.51E−06 | −4.75E−08 | −1.11E−08 | −2.66E−10 |
| S516 | 0 | −1.05E−02 | 8.29E−04 | 6.13E−06 | −6.95E−06 | 1.00E−06 | −3.59E−08 | 8.51E−11 |
| S517 | 0 | −6.84E−04 | −2.05E−05 | 7.85E−05 | −2.63E−05 | 3.66E−06 | −2.38E−07 | 5.76E−09 |
| S518 | 0 | −5.54E−04 | 1.30E−04 | −1.02E−05 | −2.03E−06 | −3.12E−07 | 1.04E−07 | −7.33E−09 |

The values of certain important parameters of the zoom lens 500 including equivalent focal length, field of view, f-number and the variable pitches d1, d2 and d3 at the wide-angle end, the intermediate state or the telephoto end are listed in Table 6.

TABLE 6

|  |  | Wide-angle end | Intermediate state | Telephoto end |
|---|---|---|---|---|
| Equivalent focal length (mm) | | 10.51 | 19.28 | 28.04 |
| F-number | | 3.00 | 4.25 | 5.50 |
| Field of view (°) | | 31.6 | 17.2 | 11.8 |
| Variable pitches (mm) | d1 | 3.20 | 3.80 | 1.00 |
| | d2 | 7.59 | 2.14 | 0.10 |
| | d3 | 1.96 | 6.80 | 11.65 |

FIG. 6A shows the result of simulating the astigmatic field curvature of the zoom lens 500 at the wide-angle end using different light wavelengths including 470 nm, 510 nm, 555 nm, 610 nm and 650 nm, wherein the lateral axis is the distance from the focal plane, of which the maximum value is 0.028 mm, the vertical axis is from zero to the maximum field of view (15.8°), "S" means the data of the sagittal direction, and "T" means the data of the tangential direction. FIG. 6B shows the result of simulating the distortion using different light wavelengths including 470 nm, 510 nm, 555 nm, 610 nm and 650 nm, wherein the lateral axis is the distortion in percent, of which the maximum value is −1.916%, and the vertical axis is from 0 to the maximum field of view (15.8°). FIG. 7A/7B is different from FIG. 6A/6B in that its simulation is for the telephoto end, wherein the maximum value of the vertical axis (namely the maximum field of view) is 5.94° and other simulation conditions are the same as those of FIG. 6A/6B.

As shown in FIGS. 6A, 6B, 7A and 7B, the zoom lens 500 has good imaging qualities in terms of the distortion and the astigmatic field curvature when the focal length is at any of the wide-angle end and the telephoto end. Therefore, the zoom lens 500 of this embodiment has merits of easy assembling and control while maintaining good imaging quality.

In summary, the zoom lens of this invention is able to meet the requirement of continuous optical zoom just by relative movement between the first lens group and the second lens group. Therefore, the optical arrangement of the zoom lens is simpler, and assembling and control of the same are easier while maintaining good imaging quality.

Although the present invention is described in detail with reference to the foregoing embodiment, a person of ordinary skill in the art should understand that, the technical solutions of the foregoing embodiments may also be modified or equivalent substitutions may be performed on some or all technical features. The modifications and substitutions do not cause the essence of the corresponding technical solutions to depart from the scope of the technical solutions of the present invention.

What is claimed is:

1. A zoom lens, comprising:
a first lens group, comprising a first lens, a second lens, a third lens and a fourth lens arranged in sequence from an object side toward an image side; and
a second lens group, disposed between the first lens group and the image side, and comprising a fifth lens, a sixth lens, a seventh lens and an eighth lens arranged in sequence from the object side toward the image side,
wherein
a relative movement between the first lens group and the second lens group is allowed, whereby the zoom lens zooms between a wide-angle end and a telephoto end,
while the zoom lens is switched from the wide-angle end toward an intermediate state, the first lens group is moved toward the image side,
while the zoom lens is switched from the intermediate state toward the telephoto end, the first lens group is moved toward the object side, and
while the zoom lens is switched to the intermediate state, the zoom lens has a zoom ratio of 1.83,
wherein while the zoom lens is being focused for a same zoom ratio, a distance between the first lens group and the second lens group is maintained constant.

2. The zoom lens of claim 1, while the zoom lens is switched from the wide-angle end toward the telephoto side, the second lens group is moved toward the object side.

3. The zoom lens of claim 1, which satisfies the following relationships:

$5<T/H<10$, and $0.3<(D_{11} \times F_w)/(H \times F_t)<0.9$, wherein H represents a maximum imaging height of the zoom lens, T represents a total length of the zoom lens, $D_{11}$ represents a diameter of the first lens, $F_w$ represents an equivalent focal length of the zoom lens at the wide-angle side, and $F_t$ represents an equivalent focal length of the zoom lens at the telephoto side.

4. The zoom lens of claim 1, further comprising:
an optical steering element, having a constant position in the zoom lens.

5. The zoom lens of claim 1, further comprising:
an aperture stop, disposed between the first lens group and the second lens group.

6. The zoom lens of claim 1, wherein the first lens group has a negative diopter, and diopters of the first lens, the second lens, the third lens and the fourth lens are positive, negative, negative and positive, respectively.

7. The zoom lens of claim 1, wherein the second lens group has a positive diopter, and diopters of the fifth lens, the sixth lens, the seventh lens and the eighth lens are positive, negative, negative and positive, respectively.

8. The zoom lens of claim 1, wherein at least four of the first lens, the second lens, the third lens, the fourth lens, the fifth lens, the sixth lens, the seventh lens and the eighth lens are aspheric lenses.

9. A zoom lens, comprising:
a first lens group, comprising a first lens, a second lens, a third lens and a fourth lens arranged in sequence from an object side toward an image side; and a second lens group, disposed between the first lens group and the image side, and comprising a fifth lens, a sixth lens, a seventh lens and an eighth lens arranged in sequence from the object side toward the image side, and satisfying the following relationships:

$5 < T/H < 10$, and $0.3 < (D_{11} \times F_w)/(H \times F_t) < 0.9$, wherein H represents a maximum imaging height of the zoom lens, T represents a total length of the zoom lens, $D_{11}$ represents a diameter of the first lens, $F_w$ represents an equivalent focal length of the zoom lens at the wide-angle side, and $F_t$ represents an equivalent focal length of the zoom lens at the telephoto side.

10. The zoom lens of claim 9, wherein a relative movement between the first lens group and the second lens group is allowed, whereby the zoom lens zoom between a wide-angle end and a telephoto end, while the zoom lens is switched from the wide-angle end toward an intermediate state, the first lens group is moved toward the image side, while the zoom lens is switched from the intermediate state toward the telephoto end, the first lens group is moved toward the object side, and while the zoom lens is switched to the intermediate state, a zoom ratio of the zoom lens is 1.83.

11. The zoom lens of claim 9, wherein while the zoom lens is switched from the wide-angle end toward the telephoto end, the second lens group is moved toward the object side.

12. The zoom lens of claim 9, wherein while the zoom lens is being focused for a same zoom ratio, a distance between the first lens group and the second lens group is maintained constant.

13. The zoom lens of claim 9, further comprising:
an optical steering element, having a constant position in the zoom lens.

14. The zoom lens of claim 9, further comprising:
an aperture stop, disposed between the first lens group and the second lens group.

15. The zoom lens of claim 9, wherein the first lens group has a negative diopter, and diopters of the first lens, the second lens, the third lens and the fourth lens are positive, negative, negative and positive, respectively.

16. The zoom lens of claim 9, wherein the second lens group has a positive diopter, and diopters of the fifth lens, the sixth lens, the seventh lens and the eighth lens are positive, negative, negative and positive, respectively.

17. The zoom lens of claim 9, wherein at least four of the first lens, the second lens, the third lens, the fourth lens, the fifth lens, the sixth lens, the seventh lens and the eighth lens are aspheric lenses.

* * * * *